United States Patent [19]

Bellanca et al.

[11] 4,167,422

[45] Sep. 11, 1979

[54] LAKED HIGH MOLECULAR WEIGHT DYES

[75] Inventors: Nicolo Bellanca; Thomas E. Furia, both of San Jose, Calif.

[73] Assignee: Dynapol, Palo Alto, Calif.

[21] Appl. No.: 501,900

[22] Filed: Aug. 30, 1974

[51] Int. Cl.$^2$ .............................................. C04B 31/38
[52] U.S. Cl. ..................................... 106/289; 426/250; 426/539; 426/540
[58] Field of Search ........................... 106/289, 308 N; 426/250, 539, 540; 260/144, 37 P, 79.3 R, 46.5 E; 528/30

[56] References Cited

U.S. PATENT DOCUMENTS

| | | | |
|---|---|---|---|
| 1,286,916 | 12/1918 | Barton et al. | 106/289 |
| 2,428,665 | 10/1947 | Harrel | 426/250 |
| 3,108,846 | 10/1963 | Utsunomiya et al. | 260/144 |
| 3,137,671 | 6/1964 | Bosshard | 260/31.2 N |
| 3,269,845 | 8/1966 | Pomeroy | 426/250 |
| 3,277,075 | 10/1966 | Mayhew et al. | 260/144 |
| 3,304,297 | 2/1967 | Wegmann et al. | 260/144 |
| 3,337,288 | 8/1967 | Horiguchi et al. | 260/144 |
| 3,507,850 | 4/1970 | Cohen et al. | 260/144 |
| 3,640,733 | 2/1972 | Rast et al. | 426/540 |
| 3,920,855 | 11/1975 | Dawson et al. | 260/37 P |

OTHER PUBLICATIONS

"Hackh's Chemical Dictionary", 4th ed. McGraw-Hill Book Co., N. Y., 1969, p. 368.
"The Condensed Chemical Dictionary", 8th edition, Van Nostrand Reinhold Co., New York, 1971, p. 502.
"Studies in Polymeric Dyes I", Macromolecularization of Food Dyes, Ido et al., Sep. 1968.

*Primary Examiner*—L. Dewayne Rutledge
*Assistant Examiner*—John P. Sheehan
*Attorney, Agent, or Firm*—William H. Benz; Norman H. Stepno

[57] ABSTRACT

Organic pigment lakes are prepared by adsorption of a high molecular weight or polymeric dye onto suitable substratum or extender therefor. The properties of the resultant polymeric lakes approach those of true pigments, and said lakes exhibit maximized dye loading capacities and are exceptionally free of bleed. Thus, the applicability of lake colors is extended in the various food systems and their use is also permitted as industrial pigments.

15 Claims, No Drawings

LAKED HIGH MOLECULAR WEIGHT DYES

BACKGROUND OF THE INVENTION

1. Field of the Invention

The present invention relates to organic color pigment lakes, and, more especially, to organic pigment lakes comprised of a high molecular weight or polymeric dye reduced or diluted by a substratum or extender therefor.

2. Description of the Prior Art

A "lake" is defined by the U.S. Tariff Commission as a full strength toner or coloring agent reduced or diluted by an inert, insoluble, colorless, solid extender. The commonly used prior art substrate or extender is alumina, usually light alumina hydrate. The commercially available lakes are typically prepared by coprecipitation of an organic dye with a water-insoluble, inorganic substrate; again, usually an alumina hydrate carrier. Such materials include lakes made from Food, Drug and Cosmetic approved dyes (so-called FD&C lakes), Drug and Cosmetic approved dyes (D & C lakes), and other non-certified dyes. Typical prior art lakes include Acid Yellow 1, Lake, which is the monomeric dye,

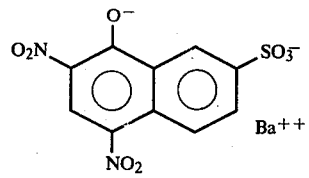

on alumina, Alizarine Lake, which is a calcium salt of the compound dihydroxyanthraquinone on alumina, and Peacock Blue Lake, also known as FD&C Blue 1 Alumina Lake and FD&C Blue 4, which is the alumina hydrate lake of the monomeric dye, Erioglaucine.

FD&C lakes are important to food processors who formulate non-aqueous or low moisture content products. Typical applications include: hard fat coatings, frosting sugars, icings and fondant coatings, cake and doughnut mixes, variegating sauces, dry beverage and dessert powders, snack foods, pet foods, and various tablet coatings for the confection and pharmaceutical industries. In addition, FD&C, and, in certain cases, D&C, lakes find use in cosmetics (lotions, creams, lipsticks, powders and soaps) and packaging materials for the food and pharmaceutical industries (inks, films, coatings and can liners).

The FD&C, D&C, and noncertified lakes find application outside these industries being employable in some pigment applications, such as in lithographic and printing inks, in artist colors, and in crayons.

Notwithstanding their present use, conventional lakes have several critical failings which limit their applicability. They generally bleed—that is, absorbed organic dye washes off the inorganic substrate in use. Also, even with lakes which exhibit small amounts of bleed at relatively neutral pH, such as from about pH 4 to pH 9, at alkaline or acidic conditions such as in strong base or acid, lakes discharge their color into a soluble form. Furthermore, the amount of dye which may be incorporated into conventional lakes is limited to about 20–40% by weight of the total lake composition. At higher dye loadings, excessive bleed is encountered. This low loading means that the desirable covering powder of pigments is often not possible to achieve with lakes. Moreover, conventional lakes are often excessively sensitive to attack and discoloration by light and chemical (such as reducing) agents.

SUMMARY OF THE INVENTION

Accordingly, it is a primary object of this invention to provide improved, non-bleeding, organic pigment lakes.

Another object of this invention is to provide improved organic pigment lakes comprising high molecular weight or polymeric dyes adsorbed onto the usual inorganic substrata for the known lakes.

Another object of the invention is to provide such polymeric lakes characterized by maximized dye loading capacity and essentially total lack of bleed.

Still another object of the invention is to provide said improved lakes which possess no less than about two (2) to three (3) times the dye loading capacity of their counterpart lakes known to the art.

Yet another object of this invention is to provide certain new lakes whose properties approach those of pigments.

Yet another object of the invention is to provide certain new lakes having enhanced stability to light and reducing agents.

Another object is to provide such lakes which do not dissolve even in concentrated mineral acid.

Still another object of this invention is to extend the applicability of lake colors in the various food systems, for example, acidic food systems, and permit of their use as industrial, deep shade and superior covering-power pigments.

In attaining the objects of the present invention, one feature resides in the laking of high molecular weight or polymeric dyes, by adsorption, onto the known commercial substrates, extenders or carriers, e.g., alumina powder. Adsorption of the polymer dye, using the same techniques and materials employed in the commercial production of prior lakes, results in from between about 5 to about 60% by weight, and even higher, of the dye being adsorbed on the, e.g., aluminaceous substrate. More importantly, the subject polymeric lakes can be prepared with no less than about 2 to 3 times the dye loading capacity as compared with their counterpart monomeric colors. Further, the new lakes are considered significantly superior to their corresponding existing lakes because same display essentially total lack of bleed and are essentially insoluble, even in the concentrated mineral acids. These desirable properties of the new lakes permit of the applicability of lakes in the various food systems and of their use as industrial pigments.

Another specific feature of the invention resides in the laking of a high molecular weight or polymeric dye, which high molecular weight or polymeric dye is comprised of FD&C or D&C-certified chromophores.

A further feature of the invention resides in the laking of a high molecular weight or polymeric dye, the chromophores of which comprise azo group-containing chromophores, and preferred among such chromophoric groups are those which contain sulfonate groups as acids or salts, with most preferred being monoazo optical chromophores which thus exist.

Other objects, features and advantages of the invention will become more apparent from the description which follows.

DETAILED DESCRIPTION OF THE INVENTION

It has now been determined according to this invention that markedly improved organic pigment lakes are prepared by adsorption of virtually the broad spectrum of the high molecular weight or polymeric dyestuffs onto the various, art recognized substrata or extenders therefor. Such polymeric dyes, as shall later be fully representatively illustrated, will hereinafter and in the claims be designated the dye component of the subject, improved organic pigment lakes.

These dyes are not composed exclusively of pure chromophore. Rather, the polymeric dye is additionally comprised of certain non-chromophoric units, chemical groups, and/or molecular segments which function to bind the chromophoric groups into the unit high molecular weight or polymeric dye.

The Polymeric Dyes

Representative dyes for use according to the invention include those having two distinct moieties; a first chromophore segment, indicated as Ch, which supplies the coloring effect; and a second non-chromophore segment (B) which links the said chromophores into a polymeric network. Thus, these representative dyes exhibit the following structural formulae (I) and (II):

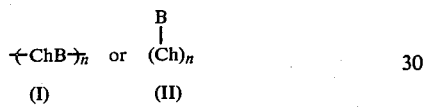

wherein "n" is an integer greater than 1, such as from 2 to about 4,000, more especially 10 to about 3,000. Although the average molecular weights which correspond to these values of n of course depend upon the "sizes" of B and Ch, it is generally preferred to employ polymeric dyes having molecular weights in the 1,000 to 2,000,000 range, so long as the requirement is met that a plurality of chromophores be present. A monomeric dye meeting this molecular size would not be capable of providing the improved organic pigment lakes of the invention. A most preferred molecular weight range is from about 5,000 to about 1,500,000, especially from 20,000 to 1,000,000.

While it will thus readily be appreciated that the precise chemical nature of any particular chromophore, Ch, is not a limitation upon the invention, and similarly with respect to any particular non-chromophore, B, there nevertheless remain certain technical restraints on the respective components. Specifically, in the total macromolecule, for each part by weight of the Ch moiety, there should be present from about 0.1 to 2 counterparts by weight of B. If the amount of B is lowered below about 0.1 parts, there arise problems with respect to color predictability and reproducibility—possibly, albeit not certainly, due to steric interaction between chromophores too closely adjacent. On the other hand, if the amount of B is raised above about 2 parts by weight, any lake superiority according to the invention is not especially marked, apparently because of the overriding diluent or masking effect of the B moieties. Especially desirable results are attained where, for each part by weight of Ch, there be present in the macromolecule from about 0.2 to 1.5 parts by weight of the B.

All of the aforesaid chromophores, Ch, are organic in nature. Inorganic colors, such as the ferricyanides and the like, are not suitable. Due to their polymeric nature, the polydye products can be made so large that they are incapable of adsorption out of the gastrointestinal tract, into the blood stream, and thus same are wholly non-toxic. This desirable property is achieved with molecular weights of 2,000 or 5,000 or higher. Hence, it is possible in food applications to incorporate in lakes chromophores which previously were not useable therein because of toxicity complications.

Exemplary chromophores include the following known azo and other dyes, especially monoazo dyes, and most especially dyes which contain sulfonate groups.

Azo Dyes

C.I. Acid Yellow #36

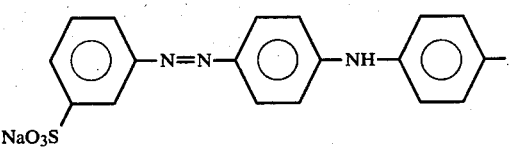

C.I. Mordant Orange #1

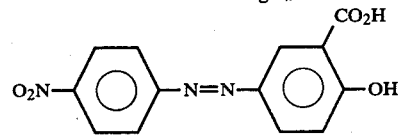

F.D. & C. Yellow #6

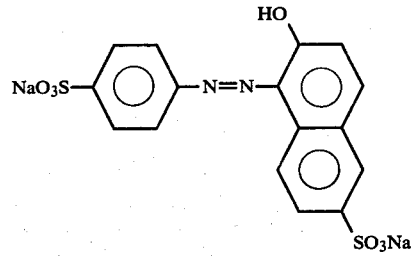

F.D. & C. Yellow #5

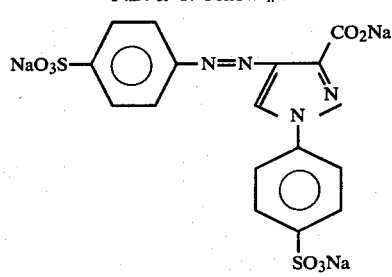

F.D. & C. Red #2

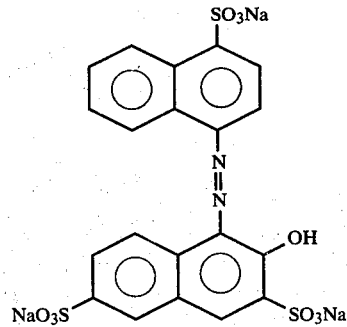

F.D. & C. Red #40

-continued

F.D. & C. #4

Orange B

C.I. Vat Blue #1

F.D. & C. Blue #2

Indigoid Dyes

Triphenylmethane Dyes

F.D. & C. Green #3

-continued

F.D. & C. Blue #1

C.I. Basic Violet #1

F.D. & C. Violet #1

C.I. Basic Green #4

Heterocyclic Dyes

C.I. Basic Blue #9

Uranine

"Other" Dyes
-continued

Sudan Blue

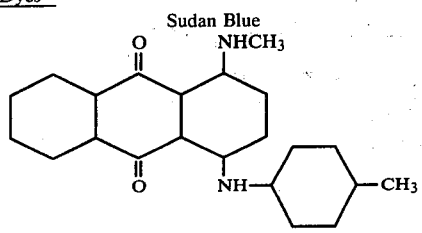

The foregoing dye list is intended merely as illustrative, and is not to be construed as limiting the specific chromophores or even classes of chromophores which can be utilized in the invention.

The foregoing chromophores are linked or bound into a polymeric network, whether homopolymeric, or randomly, block or graft inter- or copolymeric, via the non-chromophoric bridges, B. The moieties B too are organic in nature; same providing a plurality of reactive molecular sites or functional groups which directly attach to a plurality of the chromophores, or, vice versa, if the said chromophores be themselves functionally reactive, i.e., bear the reactive functional groups integral therewith, or intramolecularly, then the segments B merely provide active sites to which the said "reactive chromophores" can themselves directly attach.

Exemplary of the first type of bridges, B, there are mentioned the typical polyfunctional monomers, such as the monomeric "polyolefins" divinylbenzene and 1,4-butadiene; the polyols, ethylene glycol, other alkylene glycols, or hydroquinone; or the more complex polyfunctional polymers bearing a large number of reactive groups, such as polybutadiene, e.g., poly(1,2-butadiene), polyacrylic and polymethacrylic acids, polyalkyleneimines, e.g., polyethyleneimine [both linear and branched], poly-2- or 4-vinylpiperidine, polyalkeneamines, e.g., polybuteneamine, polyvinylalcohol, polyvinyl-(aminoalkyl)-ethers, e.g., polyvinyl-(3-aminopropyl)-ether and polyvinyl-(2-aminoethyl)-ether, cyclopolydialkylamine, polyaminoalkylmethacrylates, e.g., poly-2-aminoethylmethacrylate, polyacrolein, poly-2-amino-1-vinylethanol, polyepichlorohydrin, polyvinylamines, polysiloxanes, and copolymers and interpolymers thereof. Preferred polyfunctional entities of this first type include polyvinylamine, polyvinylalcohol and polyacrylic acid.

Examples of the second type of bridges, B, include cellulose, polyethers, hydrocarbons, and the like.

The linking bridges may also include non-chromophoric groups which modify the properties of the resultant polymer; for example, its solubility in water or oil.

It has also been determined that dyes of the above type, but wherein the one or more optically chromophoric groups are attached through sulfonamido linkages to macromolecules which are too large to be absorbed through the walls of the gastrointestinal tract, are especially suited according to the invention for food coloring applications, i.e., for the lake coloring of both edible substrates and the various beverages, especially the lake coloring of acidic food systems, for example, carbonated and still beverages, dry beverage bases, dairy products, pickles and preserves, citrus products, frostings, jellies, jelled desserts, candies, cough syrups and drops, and other pharmaceutical preparations, and the like.

In like food coloring applications, the sulfonamido linked dyes, as well as the other suitable new dyes, are advantageously of a molecular size too great to permit the sorption of same through the mucosal linings of the gastrointestinal tract; hence, these dyes will not be absorbed into the living body and there is no possibility of toxicity. Such dyes too are essentially nondegradable and will neither, e.g., hydrolyze, metabolize nor degrade, at either the conditions of food processing or the conditions of the gastrointestinal tract.

These sulfonamido dyes can be represented by the following structural formula (III):

wherein M is a nondegradable chemical group, molecule, or molecular backbone of a molecular size and structure which substantially prevents its passage and absorption through the mucosal lining of the gastrointestinal tract,

is the sulfonamido linkage in which R is hydrogen or hydrocarbon desirably of up to about 6 carbon atoms, K is the optically chromophoric group heretofore defined, and Z is a positive integer, e.g., two or greater. The sulfonamido linkage is stable and not subject to rupture under the conditions of food processing of the digestive tract. It does not interfere, to any observable degree, with the color-imparting properties of a spectrum of optical chromophores.

In the noted sulfonamido linkages, also known as sulfamyl linkages, R is hydrogen or a hydrocarbon. Hydrogen is preferred because of simplicity but, if desired, aliphatic, cycloaliphatic or even aromatic hydrocarbon R's, such as methyl, isopropyl, n-propenyl, cyclohexyl, phenyl or xylyl, may be employed. Generally, hydrocarbon R's should contain not more than about 6 carbons to ensure that same do not interfere with the chromophoric groups. It should be possible in some cases, however, to use larger hydrocarbon R's or R's containing heteroatom substitution, if desired.

The sulfonamido linkage binds the optically chromophoric groups to the non-chromophoric groups to prevent absorption of the said chromophoric groups. It is permissable, and in fact preferred, that the $SO_2$ portion of the sulfonamido group actually be an active moiety of the chromophore.

One or a plurality of the same or different chromophores may be employed in a given sulfonamido dye, the total number of chromophores being Z. Z is 2 or greater, preferably from 10 to about 5,000. More preferably, Z is 50 to about 4,000. Exemplary chromophores are those above illustrated, typically the FD&C yellows, reds, blues, green and violet, the Orange B, Malachite Green, Sudan Blue and Uranine. Exemplary backbones or chemical groups to which said chromophores are attached via the sulfonamido linkages also are as above illustrated, preferably the polyvinylamine, polyvinylalcohol, polyacrylic acid or polyepichlorohydrin.

All of the foregoing dyes useful in the preparation of the organic pigment lakes according to the invention can be synthesized utilizing a variety of methods generally well known in the art. For a more detailed description of such methods, as well as of certain of the dyes, per se, compare copending applications, Ser. No. 420,545, filed Nov. 30, 1973, and Ser. No. 456,669, filed Apr. 1, 1974, hereby expressly incorporated by reference and relied upon. It will be appreciated, though, that various representative syntheses appear in the explicit examples which follows.

Preparation of Typical Polymeric Dyes

Synthesis 1

[A] A 15 g portion of polyacrylic acid is dissolved in 75 ml of concentrated sulfuric acid with stirring at room temperature for 40 minutes. The polyacrylic acid solution is then stirred at 40° C. while 140 ml of 2.15 M hydrazoic acid [$N_3H$] in benzene is added dropwise with stirring over a period of 4.5 hours. The reaction, a Schmidt rearrangement, is continued at 40° C. for about 14 hours. The mixture is then stripped of benzene to give an almost clear yellow solution, which is cooled to 5° C. Methanol (150 ml) is then added. The resulting emulsion is centrifuged at high speed for 30 minutes to separate the precipitate. The precipitate is dissolved in 50 ml of water and gives a yellow solution. This solution is precipitated by addition to methanol, the precipitate being once again dissolved and precipitated a third time for purification. 12.06 grams of a white solid are recovered. Elemental analysis shows this product to be a copolymer of acrylic acid [mole ratio 0.46] and vinylamine [mole ratio 0.54].

[B] 10 grams of the product of Part A are dissolved in 25 ml of water. An 11% solution of sodium hydroxide is then dripped in to a pH of 9. 28.5 grams of N-acetylsulfanilyl chloride is added in small portions over a period of 5.5 hours. The pH of the solution is increased throughout the addition in order to keep the polymer in solution, gradually increasing from an initial pH of about 9 to a final pH of about 12.5. After completing the addition of N-acetylsulfanilyl chloride, conditions are maintained constant for one hour and then the cloudy yellow solution which results is filtered. The resulting clear yellow solution is dripped into a stirred 25% solution of acetic acid to give a white precipitate, which is collected, rinsed with water, and dried in vacuo to give 20.8 g of a white powder.

18.7 grams of the white powder is suspended in 75 ml of 10% aqueous hydrochloric acid, and this mixture is heated at reflux with stirring under argon for one hour [to hydrolyze the N-acetyl group]. A clear yellow solution results. This solution is cooled to about 50° C. and dripped warm into an aqueous solution of sodium acetate in an ice bath. The resulting slurry is filtered and washed with dilute aqueous acetic acid [pH3]. After drying in vacuo, 11.5 g of a fine white powder is recovered, which upon NMR analysis is shown to be the following polymeric sulfanilamide

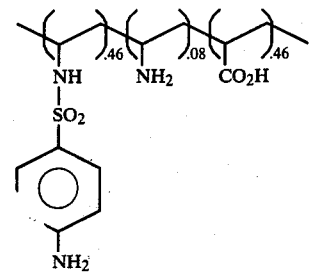

[C] 2.975 grams of the polysulfanilamide product of Part B is dissolved in 45 ml of 10% hydrochloric acid and 200 ml of water with stirring. 1.0 N aqueous sodium nitrite solution [11.0 ml] is added to give a dark yellow solution, which is then dripped gradually into a solution of 2.46 g of Schaeffer's salt in 67 ml of 10% aqueous sodium hydroxide and 90 ml of water, while stirring in an ice bath. The resulting deep red solution is stirred in the ice bath for 30 minutes, treated with 10% aqueous hydrochloric acid to a pH of 2 to yield an orange suspension which is centrifuged. The separated solids are purified by dialysis to yield 4.4 g of an intense orange dye having a color almost indistinguishable from that of Sunset Yellow [F.D.&C. Yellow #6]. Analysis showed that this dye has the following structure

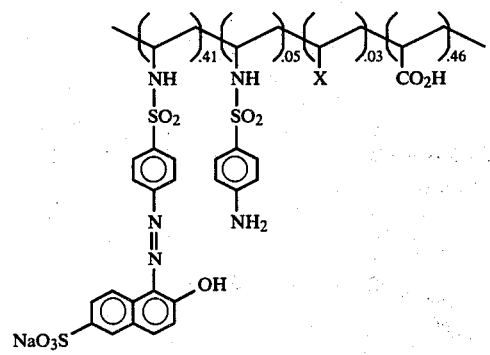

wherein X is $NH_2$ and OH. This material contains 0.25 parts of non-chromophore for each part by weight of chromophore.

Synthesis 2

The preparation of polysulfanilamide in accord with Parts A and B of Synthesis 1 is repeated, the product differing from the product of Example I only in insignificant variations in molar ratios.

1.0 grams of the above product is dissolved in 10 ml of 10% aqueous hydrochloric acid and 40 ml of water to yield a clear yellow solution. This solution is stirred at room temperature while 2.48 ml of a 1.0 N aqueous sodium nitrite solution is added. This solution is then added over a period of five minutes to a solution of 738 ml of Pyrazolone T,

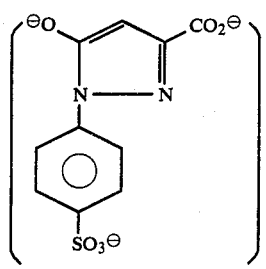

in 15 ml of 10% aqueous sodium hydroxide and 20 ml of water while stirring in an ice bath. A deep red solution results. This solution is acidified with 10% hydrochloric acid. At pH 2 a yellow-orange precipitate forms, which is separated and purified by dialysis. This product is dried and upon analysis found to be the following polymeric coloring:

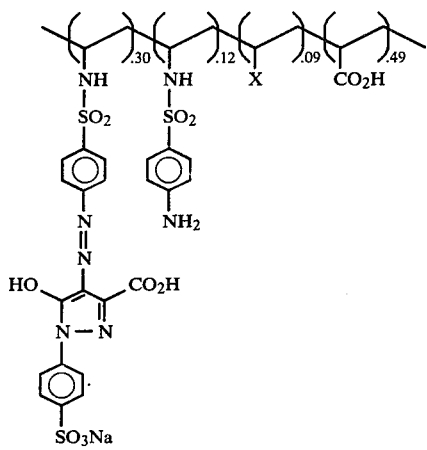

(wherein X is $NH_2$ or OH) which contains by weight about 2.3 parts of chromophore for each part of non-chromophore. This coloring is virtually indistinguishable in color from Tartrazine—F.D.&C. Yellow #5.

Synthesis 3

[A] Polyscience Corp.'s commercial branched polyethyleneimine of molecular weight 1200 is treated in accordance with the general procedures of Parts A and B of Synthesis 1 with N-acetylsulfanilyl chloride in aqueous base and hydrolyzed to yield a polymeric sulfanilamide

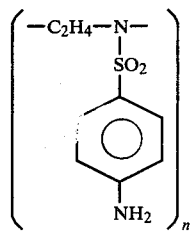

[B] 209 Mg of the sulfanilamide of Part A is dissolved in 1.5 ml of 10% HCl of 5 ml of $H_2O$ and diazotized with 0.16 ml of 5.8 M aqueous sodium nitrite and then added to 13.8 ml of a solution of 1.0 g of 8-amino-1-naphthol-3,6-disulfonic acid,

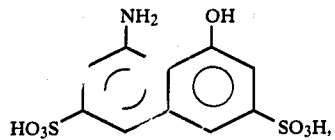

in 10 ml of 10% sodium hydroxide and 40 ml of $H_2O$. The resulting solution is deep purple. It is neutralized with hydrochloric acid and purified. The product has the chemical formula

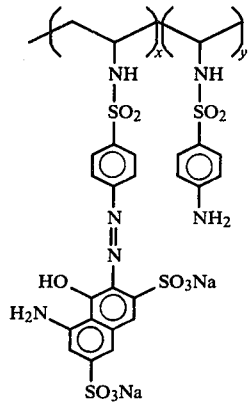

Synthesis 4

The preparation of Synthesis 1 is repeated with three modifications:
(1) The copolymer of acrylic acid and vinylamine is reacted with 4-acetamido-1-naphthalenesulfonyl chloride instead of with N-acetylsulfanilyl chloride;
(2) The diazotization of polymeric sulfanilamide with acidic sodium nitrite [i.e., $HNO_2$], is carried out for five minutes instead of 15 minutes; and
(3) Instead of Schaeffer's salt, 2-napthol-3,6-disulfonic acid [R acid] is employed as the final coupling reagent.

The product of this preparation is recovered. It substantially matches the color of Amaranth and has the following chemical structure:

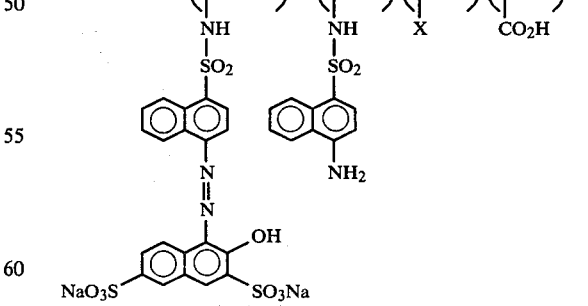

wherein X is $NH_2$ or OH.

Synthesis 5

The preparation of Synthesis 1 is repeated with one variation. Instead of the 10,000 MW polyacrylic acid employed in Synthesis 1, a higher molecular weight polyacrylic acid, obtained from Polysciences, Inc., and having a molecular weight determined by gel permeation chromatography to be 134,000, is employed. The final product has the same color properties as the final product of Synthesis 1 and has a molecular weight estimated by gel permeation techniques to be 300,000 to 400,000.

Synthesis 6

The preparation of Synthesis 1 is repeated with the following changes:

(A) Only 70 ml of 2.15 M hydrazoic acid in benzene is added. This causes the initial copolymer ratios to be 0.59 for acrylic acid and 0.41 for vinylamine. The yield is 10.2 grams.

(B) Only 15 grams of N-acetylsulfanilyl chloride is added during the reaction. The product is hydrolyzed in refluxing 10% aqueous hydrochloric acid as in Synthesis 1 to yield 8.2 g of a polymeric sulfanilamide with the following mole ratios:

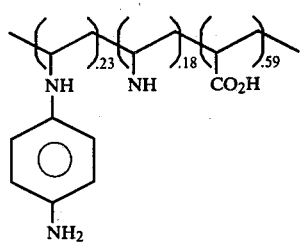

(C) Diazotization and coupling of a 2.98 g sample as in Synthesis 1 results in 3.48 g of an orange polymeric dye. The resulting final product is very similar to the product of Synthesis 1, varying only in that it contains about 0.17 molar equivalents of the chromophore instead of 0.41, 0.06 molar equivalent of residual sulfanilamide instead of 0.05, and 0.59 molar equivalent of acrylic acid instead of 0.46.

Synthesis 7

A. Preparation of Vinylacetamide

To 462 g of acetamide (technical) is added 12.45 ml 6M aqueous sulfuric acid followed immediately by 168 ml (3 moles) of acetaldehyde (99+%). This mixture is stirred and heated until the internal temperature reaches 70° C. (9 minutes). After another minute of heating at 95° C., the clear solution spontaneously crystallizes, causing a temperature rise to 106° C. The reaction product, ethylidene-bis-acetamide, is not separated. Heating and stirring are continued for another 5 minutes and a mixture of 60 g calcium carbonate (precipitated chalk) and 30 g soft glass powder is added as a cracking catalyst. The resulting mixture is heated to cracking temperature and distilled at 40 mm Hg. When the internal temperature reaches 160° C. (0.5 hr.), the receiver is changed. After another 1.7 hr. the distillation is almost over; stirring is stopped, and the heating continued. Slow distillation continues for another hour. The first distillation fraction is 95.9 g of water and acetamide. The second fraction is 466 g of orange oil and crystals. Nmr indicates this mixture to be 172 g vinylacetamide (67% yield), 192 g acetamide, 48 g ethylidene-bis-acetamide, and 54 g water.

B. Polymerization of Vinylacetamide

A red-brown solution of 403.5 g of vinylacetamide, 488 g acetamide, 108 g ethylidene-bis-acetamide, and 141 g water (one-half of five combined vinylacetamide preparations in accord with part A) in 570 ml methanol is filtered through 250 g of Amberlite ® IRC-50 ion exchange resin over an eight hour period. The column is rinsed with 1,000 ml methanol. The combined column eluant is stripped to its original volume of 1,667 ml, treated with 7.75 g of AIBN polymerization catalyst (1 mole %), deoxygenated, and stirred under argon at 65° C. for 15 hours to polymerize. Solid polymer is precipitated from the resulting very thick solution by addition to 15 liters acetone. The polymer is collected by filtration, washed with acetone and dried in a vacuum oven (80° C.) for two days to afford 459 g of crude polyvinylacetamide (contaminated with acetamide) as a yellow, semi-granular solid having a molecular weight of 200,000 as determined by DMF GPC.

C. Hydrolysis of Polyvinylacetamide to Polyvinylamine Hydrochloride

The crude polyvinylacetamide obtained in Part B (459 g) is dissolved in 1,000 ml water with heating. Concentrated hydrochloric acid (1,000 ml) was added and the resulting dark brown solution was stirred and heated at a gentle reflux (97°–106° C.) for about a day. 1,000 ml water is added in several portions to maintain solubility of the polymer. The polymer is precipitated by the addition of 1,000 ml concentrated hydrochloric acid. The mixture is cooled and a thick polymeric gum isolated by decantation and dried under vacuum at 50°–75° C. which occasional pulverization for 40 hours to give 332 g of polyvinylamine hydrochloride as a brown granular solid.

D. Conversion of Polyvinylamine Hydrochloride to Sulfonamido Adduct 280.0 G of the polyvinylamine hydrochloride of Part C is stirred with 25.0 l of water. The pH is raised from 2.5 to 10.0 by addition of NaOH. 12 Liters of tetrahydrofuran are added to yield a solution of the free amine. Next, 1,250 g (6 equivalents) of sulfonyl chloride is added slowly, pH being controlled at 9.0–9.5 by NaOH addition. 20 L of THF is added and additional NaOH is added to carry the pH to 10.5–11.0. THF is stripped and the polymer

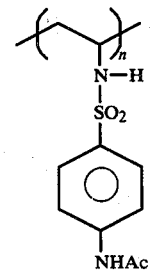

is collected.

E. Hydrolysis

To a flask is added a portion of the reaction product of Part D, 10.5 l of water and six equivalents of hydrochloric acid. The mixture was refluxed for four hours to yield a solution of the amine

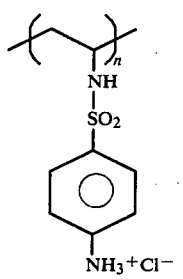

F. Diazotization and Coupling

The solution of part E containing 1.0 equivalents of polymer and 6.0 equivalents of hydrochloric acid is cooled to 15° C. 750 Ml of 1 N NaNO₂ is added with stirring. The solution is transferred to a solution of 249 g (1.15 equivalents) of Schaeffer's salt in 6 liters of water and 8 equivalents of NaOH at a temperature of about −10° C. NaOH is added to pH 12 and a solution of the polymeric Sunset Yellow colored dye

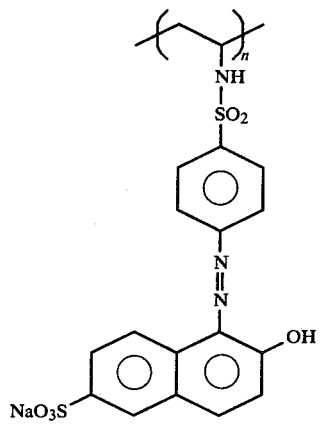

Water and light impurities are then removed to yield the dye as a dry powder.

Syntheses 8–11

A second product of Part E of Synthesis 7 is prepared and diazotized with NaNO₂ as set forth in Part F. The resulting solution is divided into several portions and treated with a variety of coupling agents.

In Synthesis 8, a solution containing 0.29 equivalents of diazo groups is treated with 143 g of pyrazalone T and after treatment under the conditions of Part F of Synthesis 7, yields 109 g of a polymeric tartrazine colored dye.

In Synthesis 9, R salt is the coupling agent such that the final dye has a formula

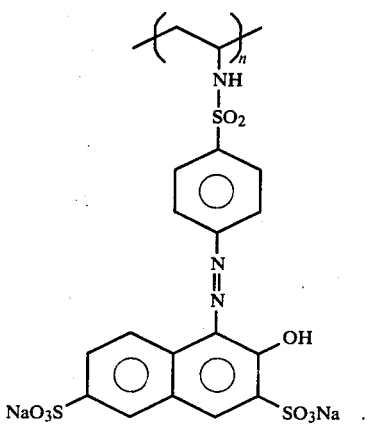

In Synthesis 10, Chicago acid is the coupling agent such that the final dye is

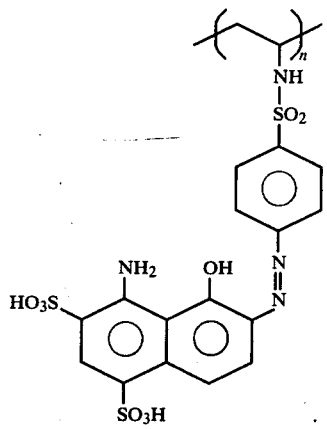

In Synthesis 11, chromatropic acid is the coupling agent such that the final product is

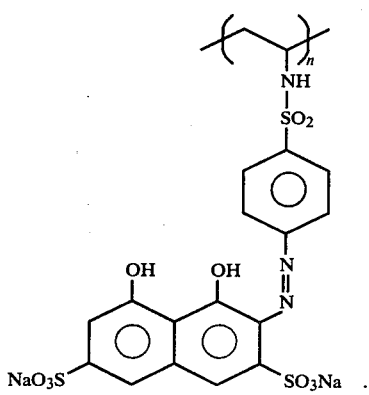

The Substrata or Extenders

The organic pigment lakes according to the invention are prepared by adsorbing the heretofore characterized macromolecular dyes onto the usual inorganic substrata or extenders for known lakes. These substrata are generally not colored, but being opaque, do increase the lakes' covering power in some cases. As a general class, the substrata may be categorized as inorganic oxidic extenders. Such substrata include commercial alumina, e.g., high and low activity alumina hydrate, or light alumina hydrate, gloss white [$3BaSO_4 \cdot Al(OH)$], talc, clay, silica, zinc oxide, titania, zirconia, boria, magnesia, mixtures thereof, and the like. These substrata are commercially available. They are sold in particulate form, often as pastes or slurries or powders, which particulate form generally is of small particles, on the order of from about 0.5 to 50 microns in size.

Because of its ready availability, alumina is a preferred substrate.

Light alumina hydrate, $Al_2O_3 \cdot 0.3SO_3 \cdot 3H_2O$ or $5Al_2O_3 \cdot 2SO_3 \cdot xH_2O$, is the commonest and thus most preferred substrate for the preparation of lake pigments and is sometimes referred to as lake white or transparent white.

Preparation of the Polymeric Lakes

A basic procedure for the preparation of lakes according to the invention was optimized as follows:

[i] A weighed amount of alumina paste is slurried with approximately 3 to 4 times its weight of deionized water.

[ii] The pH of the slurry (7.9–8.0) is adjusted to pH 4.2 by the dropwise addition of 1:1 HCl. A calculated amount of dye (based on the solids content of the alumina cake) is dissolved in the minimum amount of deionized water (in the case of dye 1, infra, ca. 6–8%) and then slowly added to the alumina slurry over a period of 15 to 20 minutes with constant, non-shear stirring (e.g., magnetic stirring bar).

[iii] During the addition of the dye and for approximately 2 hours thereafter, the pH of the slurry is maintained at 4.2 with small additions of 1:10 HCl.

[iv] The adsorption of dye onto the alumina is followed by spotting drops of the dispersion onto filter paper and observing bleed. Bleed is the diffusion of color due to the presence of dye. The reaction is considered terminated when bleeding is not observed or when further reaction does not cause bleeding to diminish.

[v] Finally, the lake is filtered through a funnel and washed thoroughly with small aliquots of deionized water. The filter cake is dried in an oven at 180° F. to constant weight, and the resulting product ground in a mortar.

Lake of Dye 1 and Comparison Thereof with FD&C Yellow #6 Lake Preparation

Utilizing the immediately above procedure, a "low activity" grade commercial alumina hydrate paste (wet cake), a dye prepared as in Synthesis 1 and having a molecular weight of about 30,000 (hereinafter, "DYE 1") and commercial FD&C Yellow #6, the lakes indicated in the following Table I were prepared and compared. The dye concentration of FD&C lakes is readily determined spectophotometrically by dissolving the pigment in acid (HCl). Because of insolubility in acid (even concentrated HCl), the dye content of DYE 1 lake is determined by treating the pigment with a strong base (KOH). This discharges the dye into solution, leaving color-free alumina as an insoluble residue. Centrifugation removes the alumina and the supernate is analyzed for dye content spectrophotometrically.

TABLE I

Preparation & Characteristics of F.D.&C. Yellow #6 & DYE 1 Lake

| Grams, Alumina | | Grams, Dye | | % Dye in Lake | | Grams, Non-adsorbed | | |
|---|---|---|---|---|---|---|---|---|
| Wet Cake | Solids[1] | Yellow 6 | DYE 1 | Theory | Analysis | Dye in Filtrate | Bleed Test | Dissolution in Acid |
| 15.0 | 3.0 | 2.25 | | 43 | 29.8 | >0.9 | Positive | Dissolves pH 3.5–4.0 |
| 15.0 | 3.0 | 2.25 | | 43 | 26.0 | >0.9 | Positive | Dissolves pH 3.5–4.0 |
| 15.0 | 3.0 | 0.75 | | 20 | 20.1 | ca 0.007 | Very slight | Dissolves pH 3.5–4.0 |
| 15.0 | 3.0 | 1.40 | | 32 | 27.1 | — | Positive | Dissolves pH 3.5–4.0 |
| 15.0 | 3.0 | 1.20 | | 28 | 26.0 | — | Positive | Dissolves pH 3.5–4.0 |
| 15.0 | 3.0 | | 0.45 | 13 | 11.9 | 0 | Negative | Insol. in Conc. HCl |
| 7.5 | 1.5 | | 0.45 | 23 | 23.0 | 0 | Negative | Insol. in Conc. HCl |
| 1.0 | 0.2 | | 0.25 | 55 | 58.0 | 0 | Negative | Insol. in Conc. HCl |

[1]Calculated on basis of wet cake as 20% solids

In addition to the filter paper spot test conducted during the preparation of the lake, bleed was assessed on the finished lake as follows: (1) after drying and grinding the lake, 0.5 grams were placed in 50 ml of deionized water and vigorously agitated; (2) the suspension was allowed to settle overnight and the supernate inspected visually for dissolved color (dye).

As reflected in the Table I, no more than about 20% by weight FD&C Yellow #6 (the "monomeric" counterpart of the DYE 1) can be adsorbed onto the "low activity" grade commercial alumina without encountering excessive bleed. The first filtrate from FD&C Yellow #6 lake preparations were colored, indicating the presence of non-adsorbed dye. Attempts to prepare FD&C Yellow #6 lakes with higher loadings (e.g., 43%) were found by analysis to contain about 26 to 30% dye. Further, these preparations exhibited excessive bleed in tests conducted after drying the finished lake. Corresponding comparative data are generated utilizing the "high activity" grade alumina. Similarly, like comparative data are generated utilizing the broad spectrum of polymeric dyes above defined, adsorbed onto any one of the typical and other lake extenders, also as above defined.

Surprisingly, it has now been determined that organic pigment lakes can be prepared with exceptionally high loadings, using even low activity alumina. Polymeric lakes containing up to and even higher than 60% polymeric dye are readily prepared. While a maximum loading capacity for the polymeric dyes is yet to be attained, the total lack of color in the first filtrate from the 60% polydye lake preparations indicates still higher loadings are possible.

In addition to the high loading, the new lakes prepared are exceptionally free of bleed. Also, while FD&C lakes display insoluble pigment properties within the pH range 4.0–9.0, the new lakes retain their insoluble character in the presence of concentrated mineral acid (HCl). FD&C lakes, on the other hand, are readily solubilized below pH 4.0.

The already established properties of the new lakes manifest the following advantages over the prior lakes:

[i] extended applicability of lakes to acidic food systems (e.g., carbonated and still beverages, dry beverage bases, etc.);

[ii] enhanced stability to light and reducing agents; and

[iii] due to the high loading, superior covering power and deep shades (approaching those of industrial pigments) are possible.

Moreover, while not wishing to be bound by this theory, it is reasoned that the higher loading of the polymeric dyes in the lakes of the invention can be explained by reason that, with a multi-point attachment of two or more chromophore units, there will always be a "tail" of many more dye units attached to each substrate particle. Thus, the total weight of the dye taken up is, therefore, not dependent upon the total number of active sites on the substrate particle, but is some multiple thereof. The multiple could well be in the order of 5× to 10×. And this is in direct contrast to the monomeric dye situation where there is probably essentially a 1:1 correlation of the number of dye molecules and active sites on the substrate particle.

While there have been described and pointed out the fundamental novel features of the invention as applied to the preferred embodiments, those skilled in the art will appreciate that various modifications, changes, and omissions in the laked polydyes illustrated and described can be made without departing from the spirit of the invention. It is the intention, therefore, to be limited only by the scope of the following claims.

What is claimed is:

1. A non-bleeding, high load capacity organic pigment color lake, which lake comprises (1) an acid soluble macromolecular polymeric dye, said dye comprising both an organic chromophoric and an organic non-chromophoric moiety chemically linked together in the ratio of from 0.2 to 1.5 parts by weight of non-chromophoric moiety for each part by weight of chromophoric moiety; said dye being absorbed onto (2) a particulate, water insoluble solid opaque inorganic oxide extender therefor having a particle size of from 0.5 to 50 microns, and said lake displaying essentially total lack of bleed and being essentially insoluble at acidic pH.

2. The organic pigment lake as defined by claim 1, wherein the macromolecular dye has a molecular weight within the range of from about 1,000 to about 2,000,000.

3. The organic pigment lake as defined by clain 2, wherein the macromolecular dye has a molecular weight within the range of from about 5,000 to about 1,500,000.

4. The organic pigment lake as defined by claim 3, wherein the macromolecular dye comprises a polymeric, nonchromophoric backone, with a plurality of chromophores grafted thereonto.

5. The organic pigment lake as defined by claim 4, wherein the chromophores are grafted to the polymeric backbone through a sulfonamido linkage.

6. The organic pigment lake as defined by claim 4, wherein the polymeric backbone comprises a member selected from the group consisting of polyacrylic acid, polyvinylalcohol, polyvinylamine and polyepichlorohydrin.

7. The organic pigment lake as defined by claim 3, wherein the macromolecular dye is of a size too large to be absorbed through the walls of the gastrointestinal tract and is essentially nondegradable and will neither hydrolyze, metabolize nor degrade at either the conditions of food processing or the conditions of the gastrointestinal tract.

8. The organic pigment lake as defined by claim 1, wherein the chromophoric moiety of the macromolecular dye comprises a member selected from the group consisting of FD&C Reds #2, #4 and #40; FD&C Yellows #5 and #6; FD&C Blues #1 and #2; FD&C Green #3; FD&C Violet #1; C.I. Acid Yellow #36; C.I. Mordant Orange #1, Orange B, C.I. Vat Blue #1; C.I. Basic Violet #1; C.I. Basic Green #4; C.I. Basic Blue #9; Uranine and Sudan Blue.

9. The organic pigment lake as defined by claim 1, wherein the chromophoric moiety of the macromolecular dye comprises an azo chromophoric group.

10. The organic pigment lake as defined by claim 9, wherein the chromophoric moiety of the macromolecular dye comprises a monoazo chromophore which exists as a sulfonate salt.

11. The organic pigment lake as defined by claim 1, wherein the extender is selected from the group consisting of alumina hydrate, gloss white, talc clay, silica, titanium dioxide, zinc oxide, and mixtures thereof.

12. A composition of matter comprising an edible food substrate and the organic pigment color lake as defined by claim 1.

13. The organic pigment lake as defined by claim 1, wherein the extender is aluminaceous.

14. The organic pigment lake as defined by claim 13 wherein the macromolecular dye contains sulfonate salt groups.

15. The organic pigment lake as defined by claim 14, wherein the extender is alumina hydrate.

* * * * *